United States Patent [19]

Allen

[11] 4,384,392
[45] May 24, 1983

[54] APPARATUS FOR THE BIAXIAL ORIENTATION OF A DEFORMABLE SHEET MATERIAL

[75] Inventor: Craig E. Allen, Clark, N.J.

[73] Assignee: Mobil Oil Corporation, New York, N.Y.

[21] Appl. No.: 221,240

[22] Filed: Dec. 30, 1980

[51] Int. Cl.³ .............................................. B29D 7/24
[52] U.S. Cl. ........................................ 26/72; 26/92;
26/106; 264/290.2; 425/66
[58] Field of Search .................... 26/71, 72, 73, 97, 51,
26/106, 92; 118/33, 34; 264/210.7, 289.6, 290.2;
425/66

[56] References Cited

U.S. PATENT DOCUMENTS

| | | | |
|---|---|---|---|
| 458,678 | 9/1891 | Narwood | 26/72 |
| 469,256 | 2/1892 | Laval | 26/51 |
| 2,582,165 | 1/1952 | Rosenfeld | 264/290.2 X |
| 2,719,323 | 10/1955 | Thompson | 26/51 |
| 3,055,048 | 9/1962 | Koppehele | 26/72 |
| 3,172,150 | 3/1965 | Dornier | 26/72 |
| 3,283,981 | 11/1966 | Allen et al. | 264/289.6 X |

FOREIGN PATENT DOCUMENTS

| | | | |
|---|---|---|---|
| 106400 | 1/1939 | Australia | 264/290.2 |
| 378342 | 8/1932 | United Kingdom | 264/290.2 |
| 953330 | 3/1964 | United Kingdom | 264/290.2 |

Primary Examiner—Robert Mackey
Attorney, Agent, or Firm—C. A. Huggett; M. G. Gilman; J. F. Powers, Jr.

[57] ABSTRACT

The present invention is an apparatus for biaxial orientation of precrystalline polyacrylonitrile polymer sheet consisting essentially of a machine direction orientor which stretches the sheet in the machine direction and a transverse direction orientor which stretches the sheet in the direction 90° to the machine direction, both processes of which may be completed rapidly in a heated essentially aqueous environment.

11 Claims, 4 Drawing Figures

APPARATUS FOR THE BIAXIAL ORIENTATION OF A DEFORMABLE SHEET MATERIAL

BACKGROUND OF THE INVENTION

1. Field of the Invention

The present invention relates to the biaxial orientation of a deformable sheet material such as that of pre-crystalline polymers and, more particularly, to the biaxial orientation of polyacrylonitrile.

Polyacrylonitrile has been known and available since the late 1940's, but has not been available in a commercially useable form until relatively recently because of its intractibility. Basically, polyacrylonitrile (hereinafter referred to as P.A.N.) cannot be melted without decomposition of its molecular structure, therefore rendering conventional hot melt extrusion techniques inapplicable.

2. Discussion of the Prior Art

Shaped articles of polyacrylonitrile have been described in prior patents. See, e.g. U.S. Pat. Nos. 2,858,290 and 3,094,502, which disclose polymerizing acrylonitrile in dimethyl sulfoxide to provide a spinning solution of polyacrylonitrile in the foregoing solvent, followed by extrusion. Reference may also be had to U.S. Pat. No. 3,437,717 which describes the preparation of a film made from a copolymer of acrylonitrile and a polyalkenyl monomer, the film being prepared by dissolving the copolymer in a polar organic solvent such as dimethyl formamide or mixtures of dimethyl formamide with dimethyl sulfoxide, followed by casting the film from the foregoing solution, removing part of the solvent, stretching the film biaxially, and removing most of the remaining solvent by air drying.

In U.S. Pat. No. 4,066,731, there is disclosed a method of preparing acrylonitrile homopolymer films which are characterized by very high tensile strength, stiffness, optical clarity, and outstanding gas barrier properties. Production according to the breakthrough process taught therein involves, inter alia, applying a hot, concentrated solution of the acrylonitrile in a suitable solvent which is also water-soluble, onto a film-supporting surface such as a cooled, flat surface or a cooled, rotating drum. Dimethyl sulfoxide is indicated as a typical solvent that is suitable for this process. The process described in the '731 patent also envisages contacting the cast film with water to remove the solvent while under constrained conditions to prevent shrinkage, and, possibly even while undergoing biaxial orientation.

In addition to the higher solvent-removal effect of exposing the film to water under restraint, this type of water treatment results in a film composed of polyacrylonitrile and water which, ostensibly, has entered the interstices and voids present in the film on a molecular scale so that the water is an integral part of the film.

Such film, by virtue of its high water content, is highly resistant to ignition. This film has a wide variety of end use applications. For example, such a film is highly suitable as a plate separator for batteries, as a semi-permeable membrane for use in dialysis or reverse osmosis, and so forth.

Moreover, if the cast film in the above process is subjected to biaxial stretching (as opposed to mere restraint) in a moist environment, for instance, in the presence of steam, moist gas, or in hot water, a final film is produced which exhibits extraordinarily high tensile strength and extra-ordinarily low gas permeability.

The biaxial stretching can be carried out in a one-step operation wherein the film is simultaneously subjected to stretching in two directions which extend at right angles to each other. Alternatively, the biaxial stretching can be carried out in stepwise manner, such as initially by longitudinal stretching and thereafter by lateral stretching, or conversely.

One method for effecting biaxial stretching simultaneously in both directions is to clamp the film between two plates, one plate having a large circular hole therein and the other plate having a small hole for the introduction of compressed air. The foregoing assembly is then immersed in hot water. At a water temperature of from at least 40° up to about 100° C., compressed air is admitted under sufficient pressure so as to cause the film to expand through the large hole to thereby form a "bubble." Within that temperature range, it is highly preferable that the higher the temperature the more promptly should the air admittal be initiated. For example, at about 70° C., the air admitted is desirably substantially immediate. The degree of stretch is, of course, determined by the size of the ultimate bubble. After a bubble of desired size has been formed, and while maintaining the air pressure so as to retain the bubble, the entire assembly may then be immersed in cold water so as to "fix" the bubble structure. The bubble portion may then be cut away (this being the portion that was subjected to true biaxial stretching) and then dried while under restraint, for instance, in an oven. During the drying, the film, which initially exhibited the spherical curvature defining the bubble, will shrink and become flat as it loses its water. The resultant flat film is dimensionally stable and has very high tensile strength and extremely low gas permeability. The bubble method, however, suffers certain disadvantages such as disproportionate biaxial orientation.

Rather than the foregoing "bubble" technique, other methods well known in the art may also be used. Thus, the biaxially oriented films embodied herein may, for example, be produced by sequentially orienting the film as, for example, by stretching it in a longitudinal direction (direction of feed) followed by stretching in a lateral direction (transverse direction), or by subjecting the film to orientation simultaneously in both the longitudinal and transverse direction. Specific apparatus and techniques for effecting biaxial orientation of the film embodied herein include, for example, the drafter-tenter frame arrangement as disclosed in U.S. Pat. No. 3,437,717 for sequentially imparting longitudinal feed direction and transverse direction orientation; and the various arrangements disclosed in, for example, the articles by J. Jack in British Plastics, June 1961, pages 312-317 and July 1961, pages 391-394, for sequential or simultaneous biaxial orientation of plastic films.

Irrespective of the employed method of stretching, it must be relatively rapid and efficient inasmuch as stretched film which is exposed to high temperatures for a period of time as short as two minutes, even in an aqueous atmosphere, will suffer a significant loss of water content, thereby causing difficulty in continuously orienting the film without its breaking. Thus to achieve smooth stretching and an attractive useable final product, the "wet" film, (in effect, film composed of polyacrylonitrile and water) should be quickly heated while preventing substantial evaporation from occurring, and then stretching the film immediately before the film can adjust to its new environment and lose much of its water.

SUMMARY OF THE INVENTION

Accordingly, the present invention is an apparatus designed to facilitate an optimally efficient biaxial orientation procedure.

It is another object of this invention to provide an apparatus designed to eliminate disproportionate biaxial orientation.

In accordance with the present invention, there is provided an apparatus designed for the biaxial orientation of a deformable sheet material consisting essentially of a longitudinal feed direction orientor and a transverse direction orientor which are preferably arranged in order set forth herein. At least two sets of nip rolls which rotate at different speeds are included in the feed direction orientor between which several idler rolls capable of preventing a narrowing deformation of the sheet are mounted in a container designed to house an aqueous solution which also contains the sheet solvent. The sheet is intended to be threaded through the first nip roll, the idler rolls and the second nip roll which is ideally capable of cooling in order to provide the setting in of the feed direction orientation.

The longitudinal feed direction orientor, in the preferred embodiment, includes a sheet feed plate and a tenter frame which secures the sheet from the sheet feed plate by means of diverging moving clamps which clamp the edges and continually separate as they progress towards the outlet end of the apparatus. In an especially preferred embodiment, the tenter frame progresses through the channel of a second medium container in which a constant aqueous backwash is provided while a stretching frame simultaneously impinges downwardly on the moving sheet.

Through the use of this apparatus, there is thusly provided an efficient system for the biaxial orientation of deformable sheet material, such as P.A.N. This results in a more uniform stretching and, quite probably, will allow for an enhanced removal of the polymer solvent, in effect, dimethyl sulfoxide, and the unpolymerized monomer, in effect, acrylonitrile

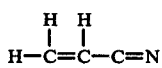

which is toxic and, consequently normally prohibits use of the polymer in industry dealing with comestibles.

BRIEF DESCRIPTION OF THE DRAWINGS

For a better understanding of the present invention, together with other and further objects, reference is made to the following detailed description, taken in conjunction with the accompanying drawings in which.

DETAILED DESCRIPTION OF THE INVENTION

Figure 1:
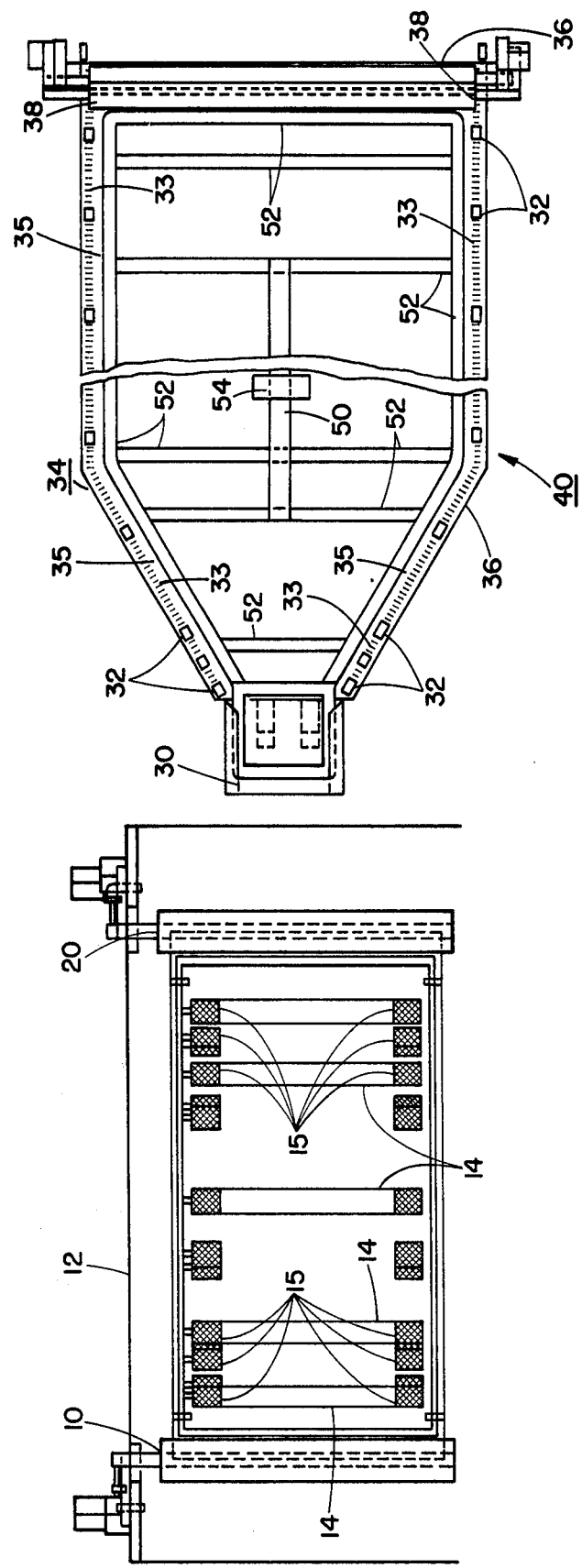
FIG. 1 is a schematic top plan view of the overall apparatus pursuant to the invention.
Figure 2:
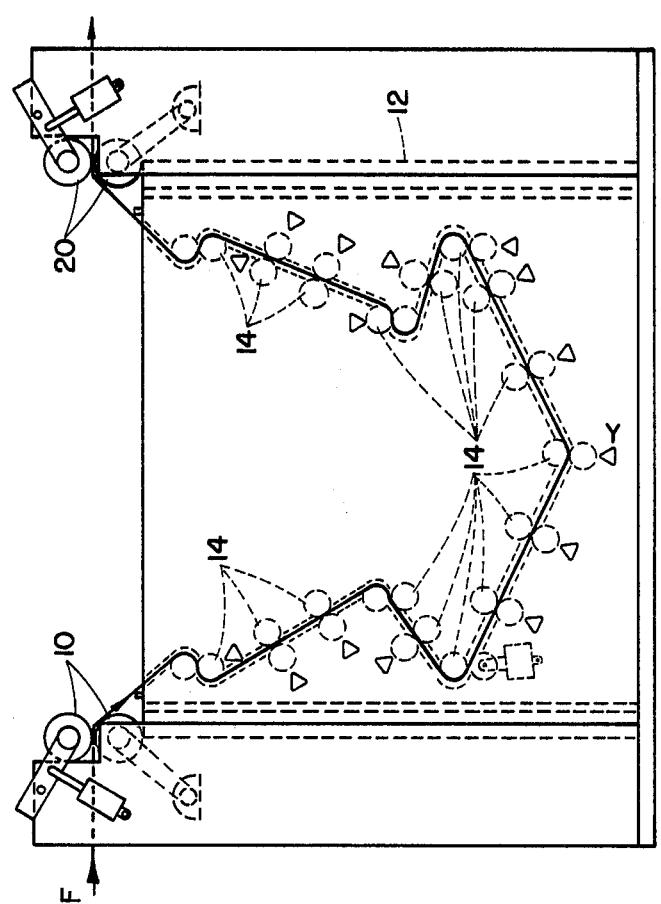
FIG. 2 is a side elevational cross-sectional view of the longitudinal feed direction orientor.
Figure 3:
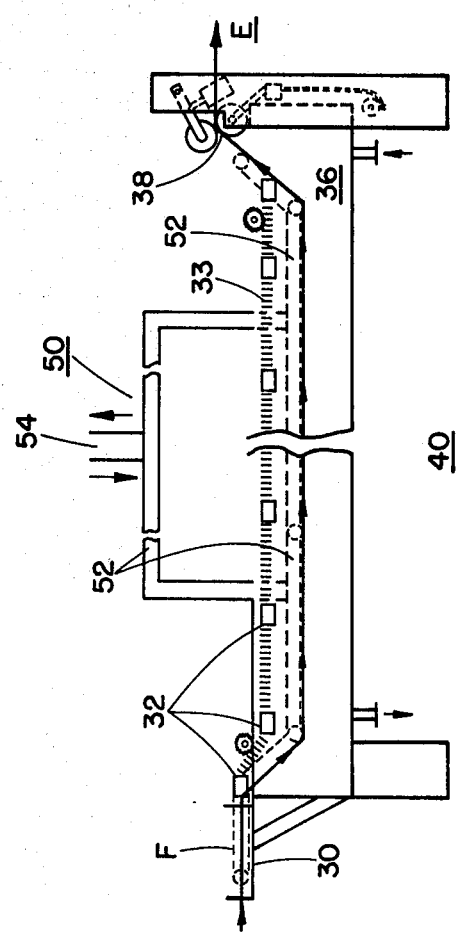
FIG. 3 is an elevated cross-sectional view of the preferred embodiment of the transverse direction orientor.
Figure 4:
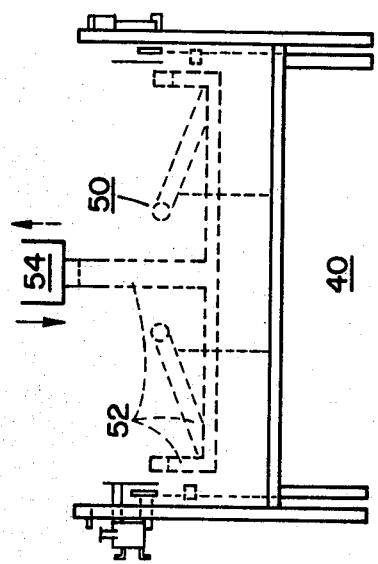
FIG. 4 is a front sectional view of the apparatus showing the stretching frame in the downward position.

In the following description, reference will be to films made from the homopolymer of acrylonitrile. However, it is to be understood that the invention additionally contemplates the preparation of films which are made from copolymers of acrylonitrile with other ethylenically unsaturated monomers which are copolymerizable therewith, wherein said copolymers predominate in units derived from the acrylonitrile monomer.

Suitable ethylenically unsaturated monomers copolymerizable with acrylonitrile include, for example, alkyl acrylates such as methyl acrylate, butyl acrylate, and the like. Generally, it is preferred to use polyacrylonitrile homopolymer. Where a copolymer is employed, the units in such copolymer derived from the acrylonitrile monomer should be present in an amount of at least about 80 percent by weight, and preferably in an amount of at least 95 percent by weight.

The polyacrylonitrile (or acrylonitrile copolymer, as the case may be) may be prepared in any conventional manner, as by emulsion polymerization, suspension polymerization, or solution polymerization. However, inasmuch as the method of the invention utilizes a solution of polyacrylonitrile in a solvent that is water soluble as the precursor of the polymer film, it clearly is most efficient to effect the polymerization in solution wherein the solvent is dimethyl sulfoxide.

As noted, the preferred solvent employed for the solution polymerization is dimethyl sulfoxide. Alternatively, the solvent may be succinonitrile or a mixture of dimethyl sulfoxide and dimethyl sulfone wherein at least 50 percent by weight of said mixture is dimethyl sulfoxide.

It is generally advantageous to polymerize the acrylonitrile monomer when dissolved in the solvent, preferably dimethyl sulfoxide, in an amount between about 30 and 60 percent by weight, based on the total weight of the solution. The optimum concentration of dissolved monomer for employment in specific instances may vary with such factors as the molecular weight which is desired to be obtained in the polymerized product, the concomitant viscosity that is desired to be achieved in the directly formed extruding solution, and the extrusion conditions.

In preparing the film-forming system, the polymerization is facilitated by use of a suitable vinyl polymerization catalyst.

Through the expression "vinyl monomer polymerization catalyst" there is meant the well known free radical catalysts conventionally used in vinyl monomer polymerization processes. In this class, there are included organic azo compounds as disclosed in U.S. Pat. No. 2,471,959 wherein the azo, —N=N—, group is acyclic and bonded from both of the nitrogens to carbons which are aliphatic in nature and at least one of which carbons is tertiary; diacyl or diaryl peroxides, such as benzoyl peroxide, t-butyl perbenzoate, cyclohexanone peroxide, and others. They may be thermally decomposed or a redox system may be used, such as a peroxide with $SO_2$ and an oxidizable heavy metal iron, such as $Fe++$, or an N,N'-dialkyl aniline. Salts of perdisulfuric acid are also useful in a redox system. The catalyst may be employed in a conventional manner and in an amount as will be apparent to those skilled in the art. Generally, from 0.1 to about 1% by weight based on the monomer is preferred.

The extruded melt desirably should be substantially free of the volatile monomer. This can be accomplished by removing the residual monomer from a normal polymerization, as by vacuum distillation, or by conducting a post-polymerization at elevated temperatures to attain substantially 100% conversion.

Ordinarily, the polymerization may be terminated with formation of a suitable film-forming solution within a time period which rarely exceeds 60 minutes and often may be as short as about 40 minutes or even less.

Advantageously, the film-forming systems may be prepared by polymerizing the dissolved monomeric material with catalytic assistance under atmospheric pressure at a temperature of between about 80° C. and 150° C. for a period of time which is between about 30 and 60 minutes. The equipment employed for the polymerization should be equipped with an efficient device for agitation.

If the polyacrylonitrile is prepared by other than solution polymerization in dimethyl sulfoxide, the polymer may be recovered from the solution, washed, and then dissolved in dimethyl sulfoxide.

In general, it is preferred that the percent conversion of acrylonitrile monomer to polyacrylonitrile be at least about 90%, and preferably in the order of 95–98%. The polymer will generally have a molecular weight of at least about 80,000. More particularly, the inherent viscosity of the polymer at 0.5 g/100 ml dimethyl sulfoxide, should be from about 0.85 to 1.7.

After extruding the solution through a suitable extrusion device, for instance, a slot die, and casting the film onto a continuous surface, the base sheet F passes through a first set of nip rolls 10 and then through at least one other set of nip rolls 20 which are designed to rotate at a speed greater than that of the first nip rolls 10 thereby stretching the sheet in the feed direction. Optimally, the second set of nip rolls rotate from about 2 to 4 times faster than the first set of nip rolls and are equipped to cool the film so as to set in the longitudinal feed direction orientation.

In order to ensure that the P.A.N. is maintained at an adequate orientation temperature, the base sheet may be passed through a bath 12 which preferably contains water at from about 160° F. to about 240° F. so that the water is readily available for incorporation into the expanding P.A.N. base sheet. The sheet is preferably guided through the bath 12 by means of idler rolls 14 which are formed with raised and/or knurled ends 15 thereby producing small pressure rolls relative to each other which firmly grip the edges of the film so that it will not "neck" in as it is being stretched in the longitudinal feed direction.

The P.A.N. sheet is then conveyed to a transverse direction orientor, designated generally as 40. A polished metal plate 30 guides the base sheet from the previous process into the operative position of the transverse direction orientor. The metal plate 30 has turned up edges which correspondingly curl the edges of the film upward so that clamps 32 may grip them.

Claps 32 are an integral part of tenter frame 34 which is made up of two generally parallel moving chains 33 which extend from adjustable diverging tracks 35 towards the apparatus outlet end indicated as E. According to the present invention, the diverging tracks 35 are mounted within a large fluid container 36 which is designed with an inflow adjacent the outlet end of the apparatus and an outflow adjacent the entrance end, neither of which are shown herein, so that a continual backwash bath may be provided thereby. Parallel chains 33 are elevated to a height whereby a sheet conveyed therebetween will be submerged about 2" into a fluid present in the container at a depth of from about 4" to 6". Ideally, the backwash fluid in water at a temperature of from about 160° F. to about 240° F., optimally 190° F., so that the sheet is (1) maintained at an orientation temperature, (2) continually cleared of solvent and residual monomer, and (3) maintained in an aqueous environment so that water is available for incorporation in the sheet during transverse stretching.

The ultimate embodiment of the invention also includes a stretching frame 50 secured for up and down movement directly above the tenter frame. The stretching frame 50 is simply a polished tubular metal frame 52 which may be lowered to any desired height by means of piston 54.

During operation the clamps 32, which may be of a standard spring-loaded trigger-activated type, grab the edges of the base sheet F as it travels over the metal plate 30. The clamps 32 with the base sheet F secured therein are continuously moved by chain 33 along diverging tracks 35 towards apparatus exit E. As the clamps diverge the base sheet is stretched in the transverse direction. Furthermore, in order to insure complete and proportionate biaxial orientation, the stretching frame 50 should be simultaneously lowered, to a height whereby the expanse of sheet material between the moving clamps is forced further downwardly by means of the polished metal frame 52. The polished metal surface protects the P.A.N. sheet material from tearing and/or localized molecular distension and the generally rectangular shape maintains both a feed direction tension and a transverse direction tension.

The film will stretch from about 2 to about 4 times its original size and is adapted to be extracted from the transverse direction orientor by a set of nip rolls 38 which are also effective for removing most of the water. An infrared bank should then be used to complete the drying process and heat setting.

While there has been described what is presently believed to be the preferred embodiment of the invention, those skilled in the art will realize that changes and modifications may be made thereto without departing from the spirit of the invention, and it is intended to claim all such changes and modifications as fall within the scope of the invention.

What I claim is:

1. An apparatus for the biaxial orientation of a deformable sheet material comprising:
   a first direction orientor which stretches said sheet in the longitudinal feed direction of the sheet material, said first direction orientor comprising a first set of nip rolls at the inlet end of said orientor and a second set of nip rolls at the outlet end of said orientor, said second set of nip rolls being rotated at a higher speed than the first set of nip rolls so as to stretch said sheet in the longitudinal direction, a first container having a fluid medium therein being arranged intermediate said first and second sets of said nip rolls, and at least one set of elongated idler rolls having knurled ends clampingly engaging the edges of said sheet to prevent the narrowing of said sheet during said longitudinal stretching, said idler rolls conducting said sheet through said fluid medium during stretching thereof in the longitudinal direction so as to maintain said sheet in a fluid environment during said longitudinal stretching, and a transverse direction orientor which stretches said sheet in a direction transversely of the longitudinal feed direction.

2. An apparatus as claimed in claim 1, wherein said knurled ends have a diameter at least 0.004 inches greater than the diameter of the elongated body of said idler rolls.

3. An apparatus as claimed in claim 1, wherein the number of said sets of elongated idler rolls comprises one to about seventeen.

4. An apparatus as claimed in claim 1, comprising means for cooling said second set of nip rolls for locking in the longitudinal direction orientation of said sheet upon contact with said cooled nip rolls.

5. An apparatus as claimed in claim 1, wherein said second set of nip rolls is rotated at a speed of from about 2 to about 4 times faster than said first set of nip rolls.

6. An apparatus as claimed in claim 1, wherein said transverse direction orientor comprises a feed plate which guides said sheet from said machine direction orientor to said transverse direction orientor, and means clampingly engaging said sheet at the edges thereof as said sheet is guided from said feed plate and stretches said sheet in a direction 90° relative to the machine direction while concurrently conveying said sheet in the machine direction.

7. An apparatus as claimed in claim 6, wherein said transverse stretching means comprises a tentering frame, said clamping means being movably supported on said tentering frame and including divergingly conveyed sheet clamps for clamping, transversely stretching, and conveying said sheet through said apparatus.

8. An apparatus as claimed in claim 7, wherein said sheet clamps diverge from each other to a distance of from about 2 to about 4 times the original width of said sheet.

9. An apparatus as claimed in claim 7, said transverse stretching means comprising a second medium container, said second medium container being arranged immediately downstream of said feed plate and including a channel for retention of a fluid medium through which said sheet is conducted while being transversely stretched by said tentering frame.

10. An apparatus as claimed in claim 9, wherein said channel comprises an inflow adjacent the outlet end of said apparatus and an outflow adjacent said feed plate, said fluid medium being water at a temperature of from about 160° F. to about 240° F. continually conveyed therethrough so as to form an aqueous backwash bath system for said sheet.

11. An apparatus as claimed in claim 9, wherein said stretching means comprises a stretching frame mounted for downward and upward movement immediately above said second medium container, said stretching frame having dimensions smaller than the dimensions defined by the distance between the two sides of said tentering frame and the length of said channel so that said stretching frame is lowered against said sheet as said sheet is being carried by said clamps thereby forcing said sheet downward.

* * * * *